United States Patent [19]

Lopez-Doriga Lopez-Doriga

[11] Patent Number: 4,634,642
[45] Date of Patent: Jan. 6, 1987

[54] ELECTRIC STORAGE BATTERY

[75] Inventor: Juan A. Lopez-Doriga Lopez-Doriga, Madrid, Spain

[73] Assignee: Sociedad Espanola del Acumulador Tudor, S.A., Madrid, Spain

[21] Appl. No.: 802,365

[22] Filed: Nov. 27, 1985

[30] Foreign Application Priority Data

Jul. 22, 1985 [ES] Spain .................................. 545.458

[51] Int. Cl.$^4$ .............................................. H01M 2/26
[52] U.S. Cl. ...................................... 429/121; 429/8; 429/175; 429/176
[58] Field of Search .................... 429/121, 175, 176, 8

[56] References Cited

U.S. PATENT DOCUMENTS

| | | | |
|---|---|---|---|
| 1,538,031 | 5/1925 | Dunzaveiler | 429/176 |
| 1,546,648 | 7/1925 | Glidden et al. | 429/176 |
| 2,170,750 | 8/1939 | Foster | 429/121 |
| 3,770,511 | 11/1973 | Winterbottom et al. | 429/121 X |
| 4,350,746 | 9/1982 | Chambers | 429/121 |
| 4,425,414 | 1/1984 | Solomon | 429/121 X |

Primary Examiner—Charles F. LeFevour
Attorney, Agent, or Firm—Banner, Birch, McKie & Beckett

[57] ABSTRACT

An electric storage battery whose basic features are that it comprises four terminals electrically connected in pairs under the battery cover, which permits it to be used in any type of vehicle regardless of the position of its collectors, and the arrangement of two C-shaped handles pivotally connected at their ends to two vertical partition walls and capable of occupying two positions, (1) a vertical position in which they function as a handle and (2) a horizontal position in which they permit the batteries to be stacked while protecting the terminals from possible damage from the stacked weight and the shock or rubbing of one battery against the other.

4 Claims, 5 Drawing Figures

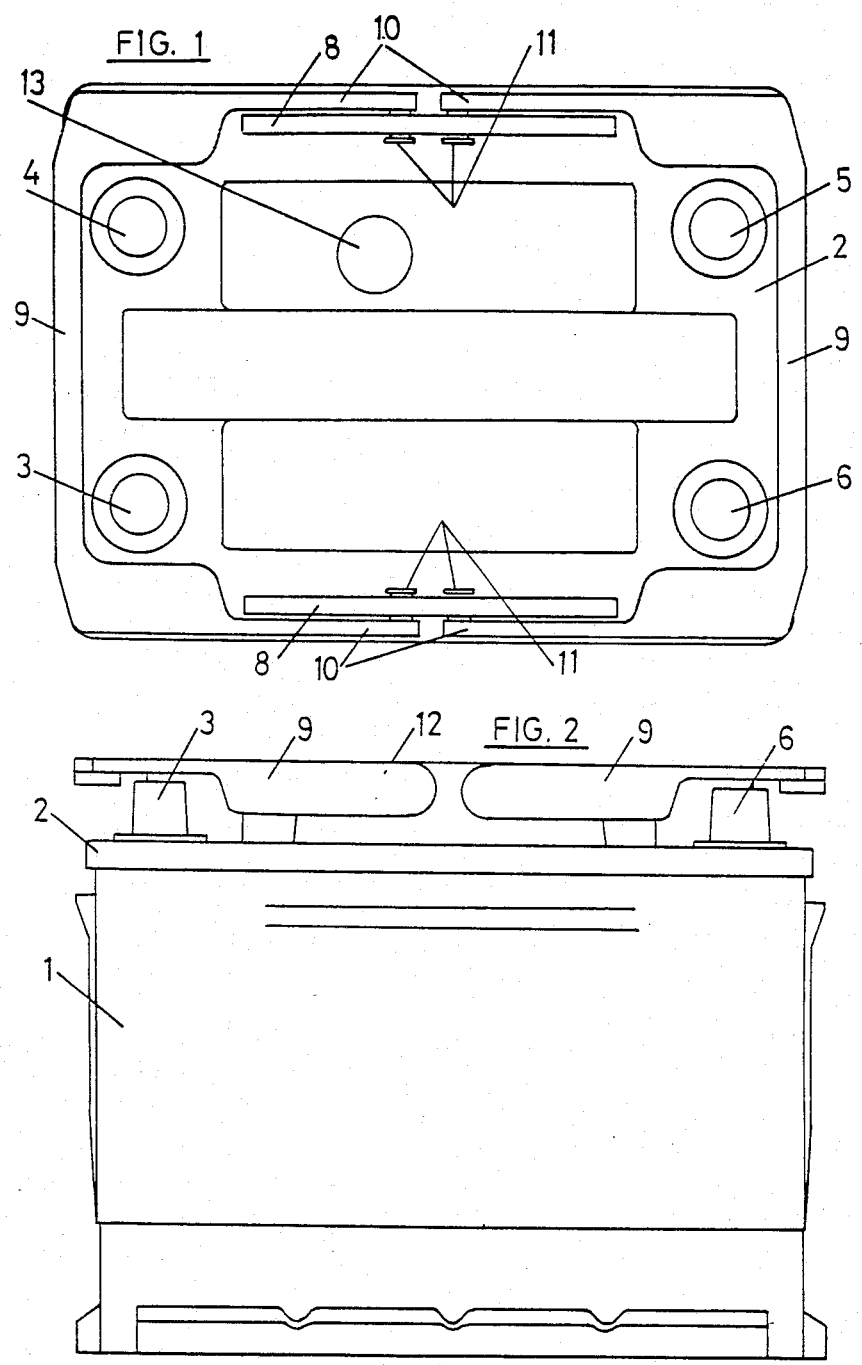

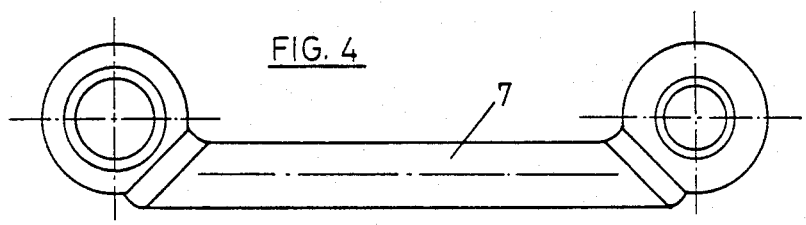
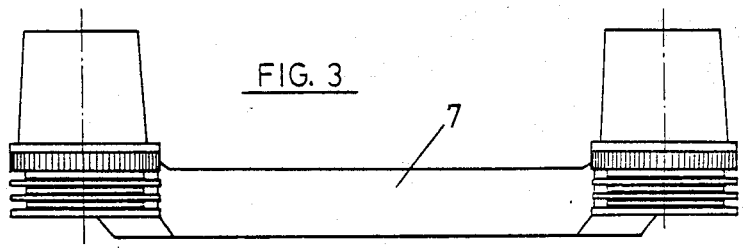

ELECTRIC STORAGE BATTERY

BACKGROUND OF THE INVENTION

The present invention relates to improvements in electric storage batteries of the type comprising a container of a generally upright form having a square or rectangular shape in plan and closed at the top by a cover through which connecting terminals extend.

The improvements constituting the subject of the present invention are especially directed to electric storage batteries of the lead-acid type, especially used as starting batteries for engines.

In the batteries of the type indicated, the container is subdivided internally into two or more cells, each of which houses alternating positive and negative electrodes and intermediate separators which can be constituted by microfibers of an inorganic type that form a type of fabric of variable thicknesses, or also by sintered compound such as, for example, polyvinyl chloride. These separators can also consist of polyethylene laminas, cellulose paste, etc.

The storage cells basically contain electrolyte which can be completely absorbed into the separators or can remain in a free state.

The current-conducting elements which form the plates or electrodes can be constituted by a base of pure lead or of alloys of lead-calcium-tin, lead-antimony-tin or any othe material which can supply a strong, self-supporting electrode which is easy to handle and paste.

As a result of the configuration of the battery container and of its weight due to the elements housed in its interior, namely, the lead electrodes and the liquid electrolyte, it is difficult to handle a battery for which reason the battery is frequently provided with handles generally located at the sides of the container. This position of the handles makes it difficult to place the batteries side by side during storage and/or transport.

On the other hand, conventional batteries have no protective means for the connection terminals. For this reason it is dangerous to stack batteries during storage and/or transport since there is a risk of damaging the terminals of the lower stacked batteries.

Another problem presented by batteries of the type indicated derives from the location or position of their connection terminals. Depending upon the structure or design of the automobile, batteries must be mounted sometimes with the positive terminal on the right and at other times with it on the left. This means that batteries must be available with covers in two different versions.

SUMMARY OF THE INVENTION

One object of the present invention is to create a battery of the type indicated which eliminates the disadvantages cited above.

The improvements constituting the subject of the present invention provide batteries with handles which, when they are not to be used as such, can be lowered to an inactive position in which they do not interfere with placing the batteries side by side. In addition, in accordance with the invention, the handles provide a protective element for the connection terminals, defining at the same time a support surface which facilitates stacking the batteries.

According to another aspect of the invention, the electric storage cell is provided with connection terminals located in such a manner that they adapt to all types of vehicles, whatever the arrangement of the collectors for positive and negative current.

In accordance with the present invention the cover has four terminals extending therethrough which are connected electrically in pairs to each other. This connection is established by two bridges which preferably run under the cover. These terminals are preferably located near the ends of the cover whereby the two terminals adjacent to each of the two smaller length sides of the cover are of the same polarity.

In this manner, whatever position the battery is in, the connections for positive and negative electric collectors of the vehicle can be made from either side of the battery.

According to another aspect of the invention the cover carries two handles mounted on the cover outside and articulated over its central part in a symmetric position. These handles can rotate about their point of articulation with the cover between two limited positions, one of rest in which they are lowered over the cover in a coplanar position and define an upper support platform located above the connection terminals, and the other in an elevated work position in which both handles are parallel and approximately perpendicular to the cover.

The handles are preferably C-shaped and are articulated via the ends of their side arms to the cover.

To this end the cover comprises two partition walls or lugs, each of which is parallel to and close to one of the greater length sides of the cover. The ends of the handles are articulated to these partition walls along two axes which are parallel to each other and to the cover.

The features and advantages explained above will be understood more easily from the following description made with reference to the drawings which show a preferred embodiment given as a non-limiting example.

BRIEF DESCRIPTION OF THE DRAWINGS

FIG. 1 is a plan view of a battery constructed in accordance with the invention.

FIG. 2 is a side elevational view of the battery of FIG. 1.

FIG. 3 is a side elevational view of one of two terminals of equal polarity united by a connecting bar or bridge.

FIG. 4 is a bottom plan view of the terminal of FIG. 3.

DESCRIPTION OF A PREFERRED EMBODIMENT

Figure 5:
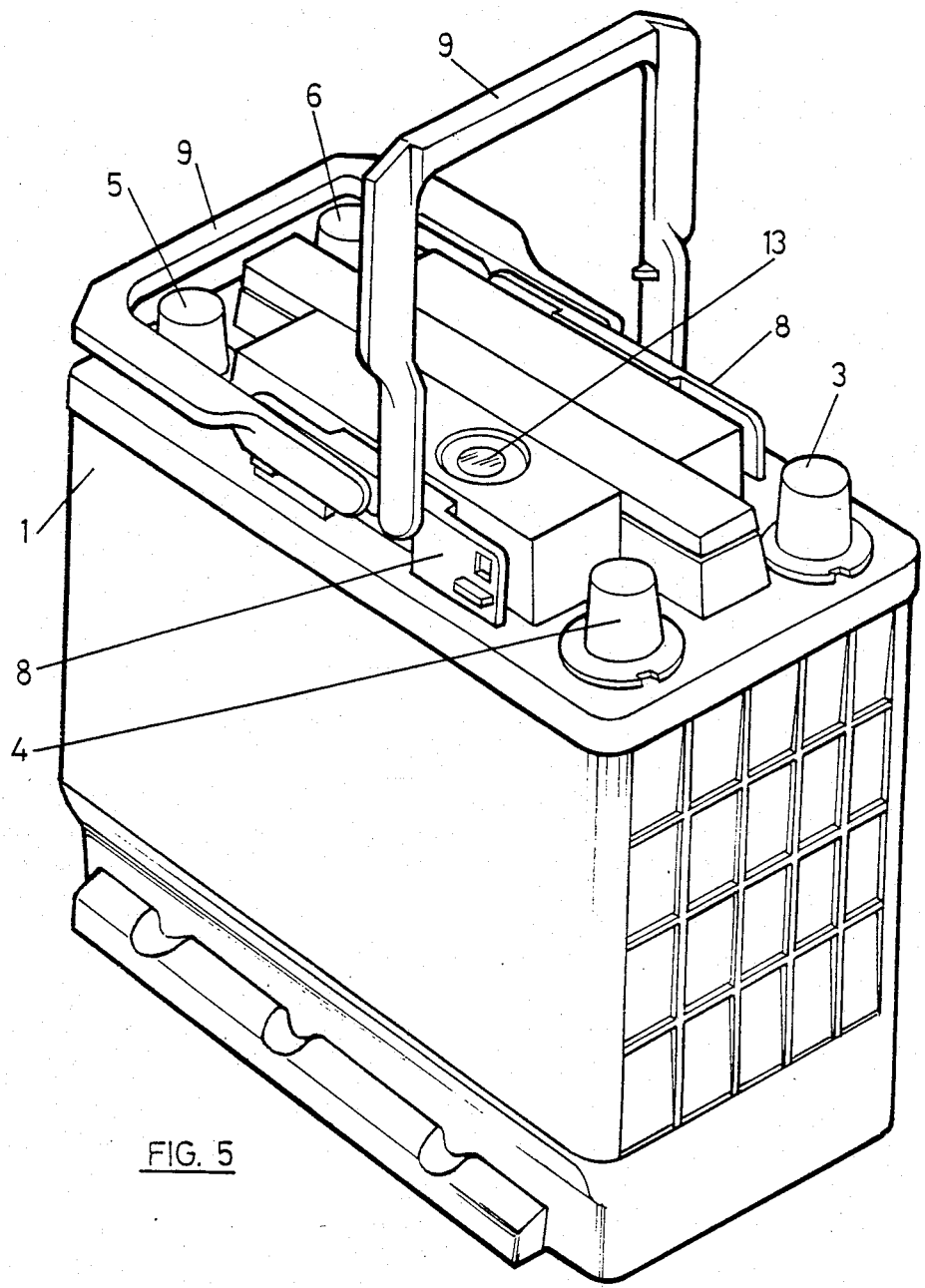
FIG. 5 is a perspective view of a battery in accordance with the invention with one handle in the working position and the other handle in the stacking position.

According to the drawings, the battery comprises a container 1 in an upright rectangular form closed at the top by cover 2.

This cover, according to the invention, is intersected by four terminals 3, 4, 5 and 6 which are situated near the corners of cover 2.

The pairs of these terminals are located laterally spaced on cover 2 with terminals 3 and 4 being on one side and terminals 5 and 6 being on the other. Each pair of terminals is electrically connected together by a bar or bridge 7 (see FIGS. 3 and 4) of the same material or alloy as the grids of the battery plates whereby one of the terminal pairs is connected to the positive grids and the other terminal pair connected to the negative grids. In this manner, two terminals are located on each side of the battery, i.e., terminals 3 and 4 on one side and terminals 5 and 6 on the opposite side, whereby the two terminals of each of these pairs have the same polarity. Therefore, the battery can adapt to being connected in any position in the vehicle when it is installed. This connection can thus be independent of the position of the positive and negative current collectors of the vehicle.

FIGS. 3 and 4 show two of the terminals of the same polarity united by the electrical connecting bar or bridge 7 which runs under battery cover 2.

Two lugs or partition walls 8 are provided on the outside of battery cover 2. Each of these lugs 8 runs parallel to and close to one of the longer sides of cover 2. Two similar C-shaped handles 9 are pivotally connected to partition walls or lugs 8 by the ends of their side arms 10 being connected to partition walls 8 by pivots 11, these pivots functioning as the articulation axes. The pivots 11 which unite the ends of the arms 10 of each handle 9 are aligned, thereby defining the pivots of the two handles 9 as two axes which are parallel to each other and to cover 2.

With the construction described, handles 9 can be placed in a lowered position overlying cover 2 as is shown in FIGS. 1 and 2, thereby defining a support platform or upper support surface 12 (FIG. 2) located above the connection terminals 3, 4, 5 and 6. In this position, handles 9 function as a protective element for the terminals and also permit the batteries to be stacked one on top of the other. To this end handles 9 have a lower support limit position in which they remain in a coplanar position as is shown in FIG. 2. When handles 9 are raised, they assume a position where the handles are essentially parallel to each other and perpendicular to cover 2 in order to function as handling and carrying handles for the batteries.

The battery of the invention can also be provided with an optical or electronic detector 13 in order to be able to determine at any instant the battery charge and the level of the electrolyte.

It will obvious from the above discussed embodiment that various other variations and modifications of the battery of this invention are possible and such will readily occur to those skilled in the art. Accordingly, the scope of this invention is not to be limited by the embodiment disclosed, but is to include any such embodiments as may be encompassed within the scope of the claims appended hereto.

I claim:

1. An electric storage battery of the type comprising a container of generally upright form closed at the top by a cover through which cover connection terminals extend wherein the container is subdivided on the inside into two or more cells which house alternating positive and negative electrodes with intermediate separators, characterized in that said cover is intersected by four terminals, said terminals being connected electrically in pairs by two bridges which run under said cover, said cover having two externally mounted handles pivotally mounted over a central part of said cover in a predetermined position whereby said handles can rotate between two limit positions, one being a rest position in which said handles are lowered over said cover to lie in a coplanar position and define an upper support platform above said terminals, and the other limit position being a raised work position in which both handles are generally parallel and approximately perpendicular to the cover.

2. A battery according to claim 1 characterized in that said terminals are located near the corners of said cover whereby the two terminals adjacent to each of the smaller length cover sides are of the same polarity.

3. A battery according to claim 1, characterized in that said cover has two partition walls on the cover exterior, each of said walls being parallel to and close to one of the greater length cover sides, said handles being pivotally connected to said partition walls.

4. A battery according to either of claims 1 or 3, characterized in that said handles are C-shaped and are pivotally connected through the ends of the side arms of said C-shaped handles to said cover along two axes which are parallel to one another and to the cover.

* * * * *